July 31, 1962 S. CORNBERG 3,047,654

TELEVISION MAKEUP APPARATUS

Filed June 15, 1960

INVENTOR.
SOL CORNBERG

BY Arthur H. Seidel
ATTORNEY

United States Patent Office 3,047,654

Patented July 31, 1962

3,047,654

TELEVISION MAKEUP APPARATUS

Sol Cornberg, 240 Central Park S., New York 19, N.Y.

Filed June 15, 1960, Ser. No. 36,422
9 Claims. (Cl. 178—6.8)

This invention relates to a television makeup apparatus, and more particularly to a makeup apparatus wherein a person may observe the manner in which the makeup will look on a television screen as the makeup is being applied.

Substantially all artists appearing on television or in the motion pictures apply makeup so that they will look their best. Heretofore, there was no apparatus which enabled a performer to observe how he would look on television or in the motion pictures as the makeup was being applied. Heretofore, the industry has relied on skilled makeup artists who are not always correct in their estimate as to the effect the makeup will have on a television screen or on film. The present invention will enable a person to observe himself on a television screen while makeup is being applied. Thus, the person need not rely on the opinion of a skilled makeup artist.

It is an object of the present invention to provide a novel makeup apparatus.

It is another object of the present invention to provide a novel makeup apparatus which will enable the person to observe himself on the television screen while makeup is being applied.

It is another object of the present invention to provide a novel makeup apparatus enabling a person to apply his own makeup and observe the effect of said makeup on a television screen while the makeup is being applied.

Other objects will appear hereinafter.

For the purpose of illustrating the invention there is shown in the drawings a form which is presently preferred; it being understood, however, that this invention is not limited to the precise arrangements and instrumentalities shown.

Referring to the drawing in detail, wherein like numerals indicate like elements, there is shown in FIGURE 1 a television makeup apparatus designated generally as 10.

Figures 1, 2, 3:
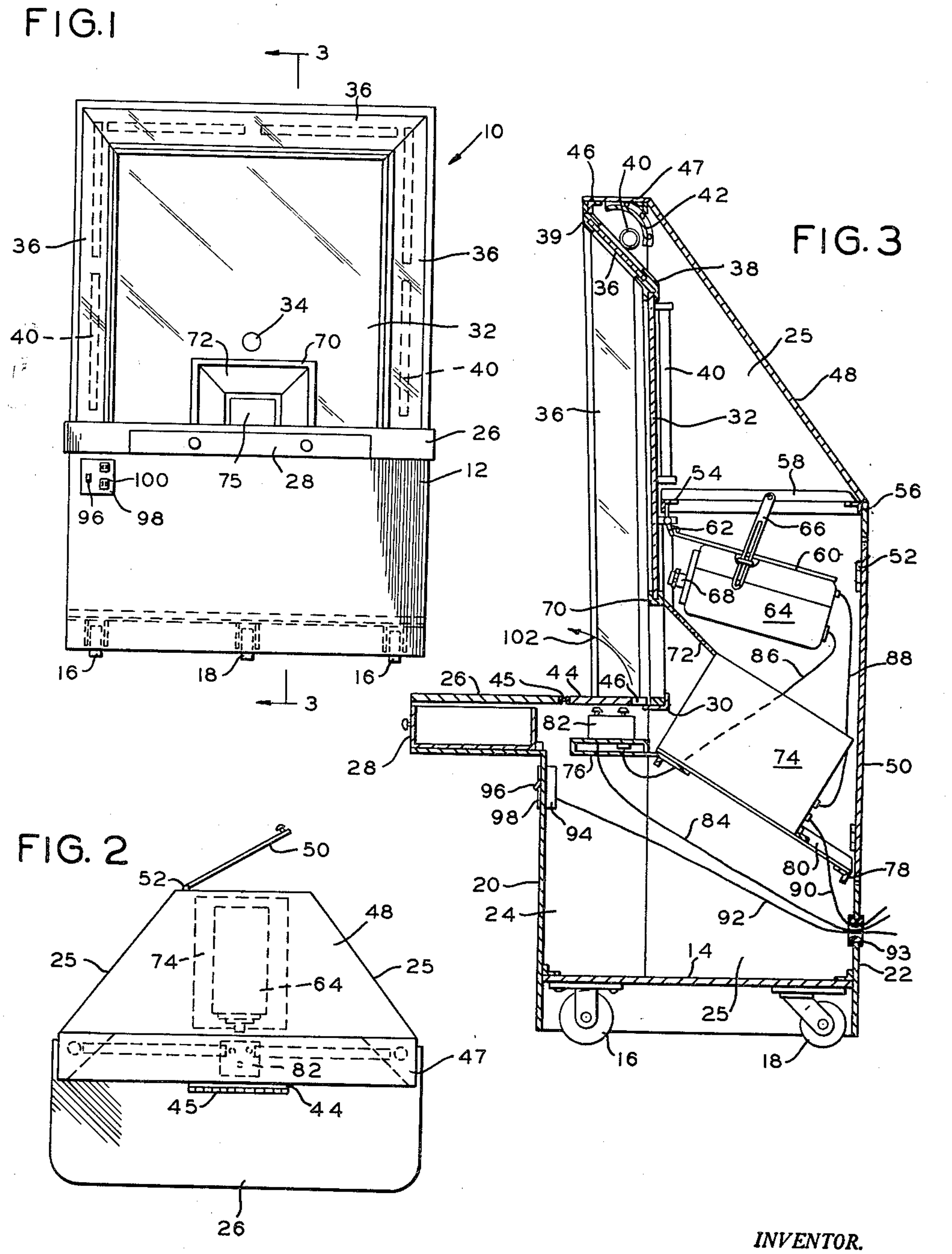
FIGURE 1 is a front elevational view of the makeup apparatus of the present invention.
FIGURE 2 is a top plan view of the makeup apparatus of the present invention.
FIGURE 3 is a sectional view taken along line 3—3 in FIGURE 1.

The makeup apparatus 10 includes a housing 12. The housing 12 comprises a bottom wall 14. The bottom wall 14 is provided with a pair of casters 16 along the front end. A swivel caster 18 is positioned on the bottom surface of the bottom wall 14 adjacent the rear end and centrally disposed between the casters 16.

A front wall 20 and a back wall 22 are fixedly secured to the bottom wall 14. As shown more clearly in FIGURES 1 and 3, the front wall 20 and the back wall 22 extend downwardly beyond the bottom wall 14 to a point substantially intermediate the floor and the pivot point for the wheel on the casters 16 and 18. The housing 12 is provided a pair of side walls. Each side wall includes a panel 24 substantially perpendicular to the front wall 20 and a panel 25 which is angled in relation to the panels 24. As seen more clearly in FIGURE 2, the rear wall 22 is smaller in width than the front wall 20. Thus, the panels 25 converge toward one another from the side panels 24 to the side edges of the back wall 22.

A shelf 26 extends outwardly from the front wall 20. The shelf 26 is preferably provided with a formica top and includes a slidable drawer 28. The shelf 26 is spaced upwardly from the floor a sufficient distance so that a person may sit on a chair with legs beneath the shelf 26.

A bracket 30 extends across the full width of the housing between the side panels 25. The bracket 30 supports a mirror 32 in an upright position tilted forward towards the shelf 26 by an angle of two degrees. The mirror 32 is provided with a window 34, see FIGURE 1, for a purpose to be made clear hereinafter. The mirror 32 is provided with a border on three sides by the panels 36 of transluscent frosted glass. The periphery of the mirror 32 is disposed within a channel on the frame 38. One of the side edges of the panels 36 is also disposed within a channel in the frame 38. The outer peripheral edges of the panels 36 are disposed within a channel of a frame 39.

The panels 36 extend at an angle with relation to the plane of the mirror 32 and the adjacent ends are cut on a bias so as to form a miter joint. A plurality of fluorescent tubes 40 are positioned behind the panels 36. A plurality of reflectors 42 are positioned behind the fluorescent tubes 40. Thus, light from the fluorescent tubes 40 is reflected through the transluscent panels 36 onto the mirror 32.

The shelf 26 is provided with an access panel 44 for a purpose to be made clear hereinafter. The access panel 44 is provided with a slot 46 along one edge and is pivotably secured along an opposite edge by the hinge 45. The housing 12 includes a top wall 47 extending across the full width of the housing above the reflector 42. A sloping rear panel 48 extends from the top wall 47 to the rear wall 22. As shown more clearly in FIGURE 2, the sloping rear panel 48 has the shape of a truncated triangle. The rear wall 22 is provided with a door 50 pivotably secured by the hinges 52. Thus, the bottom wall 14, the front wall 20, the panels 24 and 25, the shelf 26, the mirror 32, the panels 36, the top wall 47, the rear panel 48 and the rear wall 22 cooperate to form a substantially enclosed housing 12.

Brackets 54 and 56 extend between the side panels 25 as shown more clearly in FIGURE 3. The brackets 54 and 56 are horizontally disposed and positioned at a point slightly above the window 34. A bracket 58 extends between the brackets 54 and 56. A bracket 60 is pivotably secured at one end with the hinge 62 and fixedly secured at its other end to the television camera 64. An adjustable arm 66 extends between the bracket 58 and the television camera 64. Thus, adjustment of the arm 66 will result in pivotation of the television camera 64 about the hinge 62. The television camera 64 is provided with a camera lens 68. The camera lens 68 is positioned adjacent the window 34. The window 34 may be an aperture through the mirror 32, however, the window 34 is preferably provided by removing the silver applied to the back surface of the mirror 32.

The mirror 32 is provided with a slot adjacent its bottom surface. A channeled frame 70 receives the edges of the mirror defining the slot. A mask 72 extends from the channeled frame 70 downwardly at an angle with relation to the plane of the mirror 32. The mask 72 connects the channeled frame 70 and the television monitor 74. The mask 72 is funnel-shaped and terminates in an aperture coextensive with the screen 75 on the television monitor 74. Thus, the screen 75 is visible from a position in front of the mirror 32.

A bracket 76 extends horizontally between the side panels 24. A bracket 78 extends horizontally between the side panels 25 and is positioned in a plane below the plane of the bracket 76. A bracket 80 extends between the brackets 76 and 78 at an angle with relation to the bottom wall 14. The television monitor 74 is mounted on the bracket 80 so that the screen 75 is visible from a position in front of the mirror 32 by looking downwardly at an angle with relation to the mirror 32. A control box 82 is positioned on the bracket 76 beneath the access panel 44. The control box 82 contains the switches and adjustment knobs for regulating the television camera 64 and the monitor 74. The control box 82 is connected to an external source of power by wire 84. The television camera 64 is connected to the control box 82 by wire 86. The television camera 64 is connected directly to the monitor 74 by wire 88. The television monitor 74 is connected directly to an external source of power by wire 90.

Wires 84, 90 and 92 extend through a grommet 93 in the rear wall 22. Wire 92 connects the switch box 94 to an external source of power. The switch box 94 is positioned on the inner surface of the front wall 20. The switch 96 in the switch box 94 extends through the front wall 20 and a panel 98 on the front wall 20. A plurality of outlets 100 are provided on the panel 98. The switch box 94 is connected to the fluorescent tubes 40 by wires not shown. Thus, the switch 96 turns the fluorescent tubes 40 on and off.

The television makeup apparatus of the present invention is used as follows:

The television makeup apparatus 10 is moved to a convenient location. The casters 16 and 18 facilitate the movement of the television makeup apparatus 10 from one stage or location site to another. The wires 84, 90 and 92 are connected to a source of power. The person to be made up is seated on a chair in front of the mirror 32 with his legs beneath the shelf 26. The switch 96 is flipped to its on position thereby turning on the fluorescent tubes 40. The materials used for makeup are generally positioned within the drawer 28. With the materials for makeup readily accessible in the drawer 28, the person proceeds to apply the desired scheme of makeup. If it is desired to observe the effect of the makeup, the person need only place his finger within the slot 46 and pivot the access panel 44 in the direction of arrow 102. When the access panel 44 has been pivoted, the person is then able to manipulate the switches and adjustment knobs on the control box 82.

After the camera 64 and monitor 74 have been turned on by the proper manipulation of the switches and knobs on control box 82, the person may continue to apply makeup by facing the mirror 32 and looking slightly downward from the line of sight thereby observing the screen 75 on the monitor 74. The monitor 74 is preferably positioned below the camera 64 as shown in FIGURE 3. If the monitor 74 were positioned above the camera 64, a person must raise his eyebrows if he is to see the screen while looking directly at the lens 68 of the camera 64. Thus, an abnormal view of the person will be presented on the screen. Thus, a person may observe the manner in which makeup is being applied or the end result of the makeup which has been applied on a television screen prior to the performance. If the makeup has not been applied properly, the same may be corrected prior to the performance.

Thus, there is positive assurance that a person will always look his best before the television or movie camera thereby eliminating the guess work of a makeup artist.

The camera 64 can be adjusted relative to the monitor 74 by a proper manipulation of the arm 66. Access to the interior of the housing 12 for adjustment of the camera and for repairs on the camera and the monitor is provided by the door 50. Since the camera 64 is pivoted at one end, the camera has a reverse sweep relative to the monitor 74 so that a true mirror image may be obtained.

While the makeup apparatus 10 has great utility in the television and movie industry, the apparatus may also be used in hair styling parlors. Also, the apparatus 10 may be used in schools for eaching television production and acting. While the television apparatus 10 has been shown with casters, the casters may be eliminated if a semi-permanent installation is desired.

The mirror 32 preferably tilts forward towards the shelf 26 two degrees from the vertical. The tilting of the mirror 32 enables a person's forehead, hairline and a wig to be more readily observed on the screen 75. The degree of tilting may be varied if desired, however, it should remain relatively small so as not to distort the reflection of the person's face. The frosted panels 36 are preferably angled with relation to the plane of the mirror 32 so that the light from the fluorescent tubes 40 is directed toward the person and the mirror 32. The large number of fluorescent tubes extends around the major portion of the periphery of the mirror 32 and emit substantially more light than is normally provided for on a makeup apparatus.

While the mirror 32 has been shown with an aperture along its bottom edge surrounded by the mask 72, it will obvious to those skilled in the art that the mirror 32 need not extend downwardly on each side of the frame 70. Thus, the frame 70 and the mask 72 may be positioned adjacent to but below the mirror 32. In this case, the window 34 should be adjacent the lowermost edge of the mirror 32.

It will be obvious to those skilled in the art that each of the stars in a performance may be provided with a separate television makeup apparatus 10, and that the director may be provided with a screen which can be selectively tuned in to each television makeup apparatus 10. Thus, the director may observe the final makeup of each of the performers on a television screen prior to the performance.

The present invention may be embodied in other specific forms without departing from the spirit or essential attributes thereof and, accordingly, reference should be made to the appended claims, rather than to the foregoing specification as indicating the scope of the invention.

I claim:

1. A television makeup apparatus comprising a housing having a substantially upright mirror, a window in said mirror, a television camera on one side of said mirror having a lens adjacent said window, a television monitor on said housing on said one side of said mirror, means in said housing cooperating with said television camera and monitor for forming a closed circuit, said television monitor having a screen visible from the other side of said mirror and switch means on said housing for selectively operating said television camera and monitor.

2. Television makeup apparatus comprising a housing having a substantially upright mirror, a window in said mirror, a television camera on one side of said mirror having a lens adjacent said window, a television monitor in said housing below said camera, wire means cooperating with said television camera and monitor for forming a closed circuit, said television monitor having a screen visible from the other side of said mirror, and switch means on said housing for selectively operating said camera.

3. Television makeup apparatus in accordance with claim 2 including mechanical linkage means for adjusting the relative position of said television camera relative to said television monitor.

4. A television makeup apparatus in accordance with claim 2 including a shelf on said housing, said shelf having a slidable drawer, and lights on said housing positioned about a major portion of the periphery of said mirror.

5. Television makeup apparatus in accordance with claim 2 including wheel means on said housing so as to enable said housing to be movable.

6. Television makeup apparatus in accordance with claim 2 including a selectively movable panel on said housing for providing access to said switch means.

7. Television makeup apparatus in accordance with claim 2 including transluscent panels along a major portion of the periphery of said mirror, said panels being angled relative to the plane of said mirror, reflectors behind said panels, and lights between said panels and said reflectors.

8. Television makeup apparatus comprising a housing having a substantially upright mirror, a window in said mirror, a television camera on one side of said mirror having a lens adjacent said window, a television monitor in said housing below said camera, wire means forming a closed circuit between said television camera and monitor, an aperture in said mirror, mask means connecting said aperture and a screen on said monitor, said screen being visible from the other side of said mirror, and switch means on said housing for selectively operating said television camera and monitor, whereby a person may observe the manner in which makeup will look on a television screen as the makeup is being applied.

9. Television makeup apparatus in accordance with claim 8 wherein said mirror is tilted two degrees from the vertical, and pivot means adjacent said one side of said mirror for adjusting the relative position of said television camera.

References Cited in the file of this patent

UNITED STATES PATENTS

| | | |
|---|---|---|
| 2,426,752 | Sceli | Sept. 2, 1947 |
| 2,648,723 | Goldsmith | Aug. 11, 1953 |